United States Patent [19]
Yan

[11] Patent Number: 5,250,491
[45] Date of Patent: Oct. 5, 1993

[54] PREPARATION OF HIGH ACTIVITY, HIGH DENSITY ACTIVATED CARBON

[75] Inventor: Zhiquan Q. Yan, Mt. Pleasant, S.C.

[73] Assignee: Westvaco Corporation, New York, N.Y.

[21] Appl. No.: 929,166

[22] Filed: Aug. 11, 1992

[51] Int. Cl.$^5$ .................. C01B 31/12; B01J 20/20; B01D 53/02; C09C 1/44
[52] U.S. Cl. .................. 502/424; 264/117; 502/425; 502/426; 502/427; 95/146
[58] Field of Search ............. 502/424, 425, 426, 423, 502/428

[56] References Cited

U.S. PATENT DOCUMENTS

| | | | |
|---|---|---|---|
| 2,083,303 | 6/1937 | Krcil | 502/424 |
| 2,508,474 | 5/1950 | Slyh et al. | 502/424 |
| 3,676,365 | 7/1972 | Shirai et al. | 502/424 |
| 4,155,878 | 5/1979 | Tolles et al. | 502/425 |
| 4,158,690 | 6/1979 | Price et al. | 264/115 |
| 4,869,739 | 9/1989 | Kanome et al. | 55/88 |
| 5,039,651 | 8/1991 | Kosaka et al. | 502/424 |

FOREIGN PATENT DOCUMENTS 0423967  4/1991  European Pat. Off. ............ 502/425

Primary Examiner—Paul E. Konopka
Attorney, Agent, or Firm—Terry B. McDaniel; Daniel B. Reece, IV; Richard L. Schmalz

[57] ABSTRACT

Lignocellulosic carbonaceous material is activated to produce a high activity, high density gas-phase activated carbon under conditions which effectively alter the particle pore volume size distribution to optimize the carbon's mesoporosity. An agglomeration process is disclosed for producing the carbon.

10 Claims, No Drawings

PREPARATION OF HIGH ACTIVITY, HIGH DENSITY ACTIVATED CARBON

BACKGROUND OF THE INVENTION

1. Field of the Invention

The present invention relates to activated carbon and methods for preparing same. Particularly, this invention relates to new carbons useful in vapor adsorption and methods for their production. More particularly, this invention relates to activated carbon derived from lignocellulosic material prepared by chemical activation and agglomeration to produce carbon of high density and high activity.

2. Description of the Prior Art

Activated carbon is a microcrystalline, nongraphitic form of carbon which has been processed to increase internal porosity. Activated carbons are characterized by a large specific surface area typically in the range of 500–2500 m$^2$/g, which permits its industrial use in the purification of liquids and gases by the adsorption of gases and vapors from gases and of dissolved or dispersed substances from liquids. Commercial grades of activated carbon are designated as either gas-phase or liquid-phase adsorbents. Liquid-phase carbons generally may be powdered, granular, or shaped; gas-phase, vapor-adsorbent carbons are hard granules or hard, relatively dust-free shaped pellets.

Generally, the larger the surface area of the activated carbon, the greater its adsorption capacity. The available surface area of activated carbon is dependent on its pore volume. Since the surface area per unit volume decreases as individual pore size increases, large surface area is maximized by maximizing the number of pores of very small dimensions and/or minimizing the number of pores of very large dimensions. Pore sizes are defined herein as micropores (pore width <1.8 nm), mesopores (pore width=1.8–50 nm), and macropores (pore width<50 nm). Micropores and mesopores contribute to the vapor adsorptive capacity of the activated carbon; whereas, the macropores reduce the density and can be detrimental to the vapor adsorbent effectiveness of the activated carbon, on a carbon volume basis. The Adsorption capacity and rate of adsorption depend to a large extent upon the internal surface area and pore size distribution. Conventional chemically activated lignocellulose-based carbons generally exhibit macroporosity (macropore volume) of greater than 20% of the carbon particle total volume. Gas-phase activated carbon macroporosity of less than 20% of the carbon particle volume would be desirable. Likewise, a high percentage of mesoporosity (i.e., above 50% of total particle volume) is desirable.

Commercial activated carbon has been made from material of plant origin, such as hardwood and softwood, corncobs, kelp, coffee beans, rice hulls, fruit pits, nutshells, and wastes such as bagasse and lignin. Activated carbon also has been made from peat, lignite, soft and hard coals, tars and pitches, asphalt, petroleum residues, and carbon black.

Activation of the raw material is accomplished by one of two distinct processes: (1) chemical activation, or (2) thermal activation. The effective porosity of activated carbon produced by thermal activation is the result of gasification of the carbon at relatively high temperatures (after an initial carbonization of the raw material), but the porosity of chemically activated products generally is created by chemical dehydration/condensation reactions occurring at significantly lower temperatures.

Chemical activation typically is carried out commercially in a single kiln. The carbonaceous material precursor is impregnated with a chemical activation agent, and the blend is heated to a temperature of 450°–700° C. Chemical activation agents reduce the formation of tar and other by-products, thereby increasing yield.

A "hard active carbon of high adsorptive power in the shaped or moulded state" is taught in U.S. Pat. No. 2,083,303 to be prepared by impregnating pulverized organic raw material, such as "sawdust, peat, lignite or the like" with "known activating agents, such as zinc chloride or phosphoric acid" and heated to 100°–200° C. for one to one and a half hours producing a partially carbonized state wherein the material is somewhat plastic. Without reducing the temperature, the material is molded under pressure to a desired shape. The shaped material then is activated in a rotary activating retort and brought to a temperature of 450°–600° C. for about four hours.

Similarly, U.S. Pat. No. 2,508,474 teaches a gas mask activated carbon to be prepared by impregnating low density cellulosic material, such as finely divided wood in the form of wood shavings or sawdust, with concentrated zinc chloride, and heating to 120°–145° C. while agitating for not less than fifty minutes. The reacted mass then is compacted into "forms of appreciable size;" said forms are dried at 160°–300° C.; the dried forms are crushed into granular particles; the granules are calcined at 675°–725° C.; and, after leaching out of the particles a greater portion of residual zinc chloride, recalcining the activated carbon product at 1000°–1100° C. for at least thirty minutes.

These representative techniques have produced activated carbon of adequate activity and density for many gas-phase applications, especially for purification and separation of gases as in industrial gas streams, in odor removal in air conditioning systems, and in gas masks. However, older technology gas-phase activated carbons have not proven entirely satisfactory in some applications for recovery (not just removal) of organic vapors which involves adsorption onto the carbon surface followed by desorption from the carbon for recapture. In fact, due to environmental concerns and regulatory mandates, one of the largest single applications for gas-phase carbon is in gasoline vapor emission control canisters on automobiles. Evaporative emissions vented from both fuel tank and carburetor are captured by activated carbon.

Fuel vapors, vented when the fuel tank or carburetor is heated, are captured in canisters generally containing from 0.5 to 2 liters of activated carbon. Regeneration of the carbon is accomplished by using intake manifold vacuum to draw air through the canister. The air carries desorbed vapor into the engine where it is burned during normal operation. An evaporative emission control carbon should have suitable hardness, a high vapor working capacity, and a high saturation capacity. The working capacity of a carbon for gasoline vapor is determined by the adsorption-desorption temperature differential, by the volume of purge air which flows through the carbon canister, and by the extent to which irreversibly adsorbed, high molecular weight gasoline components accumulate on the carbon.

Because of various economic considerations and space limitations in placing the carbon canister onboard a vehicle, this particular application of granular or shaped activated carbon requires higher activity and higher density properties than typically produced by the older technology noted. One method to control product density is taught by published European Patent Application 0 423 967 A2. The applicants note "a number of problems inherent in the use of wood as a raw material to produce directly a chemically activated pelletised form," claiming it to be "impossible to produce a high density activated carbon from a wood flour material" for lack of sufficient natural binding agent. An improved product (of substantially increased density) is claimed by use of, as a starting material, a "young carbonaceous vegetable product" having a "high concentration of natural binding agent." Such materials include nut shell, fruit stone and kernel, and in particular olive stone, almond shell, and coconut shell.

Also, U.S. Pat. No. 5,039,651 teaches densification of activated carbon product from cellulose materials including coconut shells, wood chips, and sawdust by pressing after initially heating to a relatively low temperature, followed by extrusion and calcination. Yet, with this improved processing the patentees could produce only carbons that were measured to have a volumetric working capacity (in terms of butane working capacity, or BWC) of up to 12.3 g/100 cm$^3$, although BWC values up to 15 g/100 cm$^3$ are claimed.

These prior art gas-phase carbons may have been satisfactory for limited volumes of vapors emitted from the carburetor and fuel tank. Because of impending environmental regulations requiring capture of greater amounts of fuel vapor emissions, it is anticipated that the volume of these additional vapors, combined with the space limitations and economic considerations which limit expansion of the size of canister systems, will require activated carbons with higher densities, higher activities, and higher volumetric working capacities than disclosed by the prior art (e.g., BWC>15 g/100 cm$^3$).

Recently, co-pending (and commonly assigned) application Serial No. 07/853,133 described activated carbons of high activity and relatively high density suitable for solvent and vapor capture and recovery prepared by chemically activating carbonaceous material fragments (i.e., "discrete particles"), heat plasticizing the particles to begin transition to thermoset, densifying the particles by mechanical shaping (in a spheronizer), further heating the shaped particles to thermoset, and further heating the thermoset shaped particles to 425°-650° C. Unfortunately, the spheronizing equipment limitations related to such process restrict capacity to below commercial production levels. It is an object of this invention to provide a novel alternative chemical activation process for producing high activity, high density gas-phase activated carbons on a commercial scale. It is a further object of this invention to provide a chemical activation and agglomeration process for producing high activity gas-phase activated carbons without sacrificing density.

SUMMARY OF THE INVENTION

The above objects of the invention are achieved, unexpectedly, by the chemical activation of a carbonaceous material, preferably lignocellulosic material, with a chemical activation agent in a manner to produce a plastic intermediate product which is densified to effectively minimize the macropore structure of the activated carbonaceous material. Densification is followed by increasing the temperature of the shaped product at a controlled rate to about 550° C.

Departing from the "discrete particle" process using a spheronizer (wherein each individual particle of acid char retains some integrity during processing), the above object of the invention is achieved, unexpectedly, by an agglomeration process in a high speed pin mixer. An acid char is produced by the chemical activation of a carbonaceous material, preferably lignocellulosic material, with a chemical activation agent and then heated in a manner to produce an intermediate product which is subjected to shaping and densification by agglomeration in a high speed agglomeration device, such as a pin mixer, to effectively minimize the macropore structure of the activated carbonaceous material. (The acid char optionally may be pulverized in a separate step prior to agglomeration in the pin mixer, but such is not necessary as the early stage of the pin mixer effectively performs this function before the granular nature of the activated material is "reconstructed" by agglomeration to form a basically spheroidal shaped pellet in the later stage of the pin mixer.) After initial pulverization, the pin mixer introduces such high amounts of energy into the material that the thermoplastic fine particles begin to "melt" partially, forming very strong particle-to-particle bonds after resolidification. This densification is followed by increasing the temperature of the shaped product at a controlled rate to about 550° C. The novel high activity, high density gas-phase activated carbons produced are characterized by butane working capacities from above 15 to about 25 g/100 cm$^3$, preferably from about 17 to about 25 g/100 cm$^3$, and more preferably from about 19 to about 25 g/100 cm$^3$, a butane activity of from about 60 to about 80 g/100 g, preferably from about 65 to about 80 g/100 g, and more preferably from about 70 to about 80 g/100 g, and a density of from about 0.25 to about 0.40 g/cm$^3$, preferably from about 0.27 to about 0.40 g/cm$^3$, more preferably from about 0.30 to about 0.40 g/cm$^3$.

Preferably, such an activated carbon material also would exhibit a mesopore content of greater than about 50%, preferably greater than about 60%, and more preferably greater than about 70%, based on the total particle volume, and a macropore content of less than 20%, preferably less than 18%, and more preferably less than 15%, based on the total particle volume.

DESCRIPTION OF THE PREFERRED EMBODIMENTS

The raw material precursor in the invention chemical activation may be any of the carbonaceous material of plant or mineral origin earlier recited. Preferred precursors primarily are lignocellulosic materials of plant origin and include wood-based materials such as wood chips, wood flour, and sawdust, as well as nut pits and nut shells such as coconut shell. Chemical activation agents may include: alkali metal hydroxides, carbonates, sulfides, and sulfates; alkaline earth carbonates, chlorides, sulfates, and phosphates; phosphoric acid; polyphosphoric acid; pyrophosphoric acid; zinc chloride; sulfuric acid; and oleum. Preferred among these are phosphoric acid and zinc chloride. Most preferred is phosphoric acid.

The invention methods for producing the novel carbon can be described generally by the following sequence of steps:

1. Activating agent/lignocellulose material blending
2. Heat treatment (plasticization)

3. Shaping and densifying
4. Activation

The activation typically occurs in a rotary kiln in which the temperature of the thermoset shaped mixture is raised to about 550° C. This basic process normally is followed with washing and drying steps. Generally, the energies employed in the invention shaping and densifying step generate temperatures (from about 35° to about 120° C.) such that the shaped, dense particle is thermoset prior to activation. Optionally, however, a second heat treatment step after shaping and densifying but prior to activation may be employed if the shaping and densifying step is carried out in conditions not producing a thermoset material.

One particular method for producing the invention activated carbon product involves blending a 3:1–1:1 mixture respectively of a chemical activating agent, preferably phosphoric acid or zinc chloride, with a lignocellulose material, preferably wood chips, sawdust, or wood dust (or wood flour), with agitation for up to one hour at a temperature of from about 35° C. to about 95° C., after which the mixture is spread on a flat surface in layers of a thickness of from about 6 mm to about 25 mm. The mixture is subjected to a further heat treatment at a temperature of from about 35° C. to about 95° C. for a time sufficient that the mixture material goes through a transition from a highly plastic phase to begin to thermoset. Then the material is subjected to successive steps of pulverizing (if larger materials like wood chips or sawdust is the precursor) into fine particles and then re-agglomerating the particles to granular size and shape (generally spherical). Optionally, the shaped material may be heat treated again at from about 35° C. to about 120° C. to complete the densification by completing the thermosetting process. Upon complete elimination of plasticity, the temperature is gradually increased to about 550° C.

Typical product characteristics resulting from this process are shown in Table I.

TABLE I

| Invention Activated Carbon Product Characteristics | |
|---|---|
| Butane Working Capacity | 18.1 g/100 cm$^3$ |
| Butane Activity | 69.7 g/100 g |
| Surface Area | 2420 m$^2$/g |
| Apparent Density | 0.29 g/cm$^3$ |
| Particle Density | 0.48 g/cm$^3$ |
| Mesopore Content | 60% |
| Macropore Content | 12% |

The surprising improvement in butane working capacity of the new carbon product reflects a major increase in mesoporosity of the individual carbon particles, at the expense of macroporosity.

A standard determination of surface area of activated carbon usually is by the Brunauer-Emmet-Teller (BET) model of physical adsorption using nitrogen as the adsorptive. This was the method employed in calculating the invention carbon surface areas, based on nitrogen adsorption isotherm data in the range of 0.05 to 0.20 relative pressure.

In the case of granular activated carbon, the density is an important feature of the effectiveness of the adsorbent, as many applications of granular or shaped activated carbon involve a static active carbon bed of fixed volumetric size. The apparent density of the invention activated carbon is measured according to the method ASTM D 2854. Measurements of apparent density of carbon in a packed bed of particles reported herein were based on 10×25 mesh carbon materials.

The density of the individual carbon particles was determined by displacement of mercury using a Micromeritics Pore Sizer 9300 instrument. The density is based on the mass of a particle and its volume including pores smaller than 35 micrometers.

Butane activity of the invention carbons was calculated by placing a weighed sample of the dry activated carbon, approximately 15 ml in volume, in a 1.45 cm diameter tube and admitting butane gas therein. The amount adsorbed at saturation at 25° C. is weighed and reported as butane activity in grams of butane per 100 grams carbon (g/100 g). The tube then is purged with air at 25° C. at 250 ml/min. for 40 minutes, and the amount of butane removed is reported as butane working capacity (BWC) in grams of butane per 100 ml of carbon (g/100 cm$^3$). The carbon mass to volume conversion is made on the basis of the measured value of the carbon apparent density.

Porosity in pores larger than 50 nm (macroporosity) was determined using a Micromeritics Pore Sizer 9310 which measures the volume of mercury forced into pores under the influence of pressure. The distribution of pore volume with pore size is calculated using the Washburn equation, a standard model.

Porosity in pores smaller than 50 nm was determined using a Micromeritics DigiSorb 2600. Adsorption isotherm data for nitrogen, measured at a temperature of about 77 K is used with the Kelvin and Halsey equations to determine the distribution of pore volume with pore size of cylindrical pores according to the standard model of Barrett, Joyner, and Halenda. For the purposes of the examples and the invention claimed herein, macroporosity consists of pore diameters greater than 50 nm, mesoporosity consists of pore diameters of from 1.8 to 50 nm, and microporosity consists of pore diameters of less than 1.8 nm.

In the preferred embodiment of the invention, after the blending and heat treatment steps as above, the critical steps of (shaping and densification are achieved in a high-speed mixer/agglomerator such as a pin mixer where spherical micropellets of plastic char with a high density are formed by growth agglomeration of the smaller fine particles and powders in the presence of moisture. When large granules or loose agglomerates of partially charred (i.e., acid reacted) sawdust are introduced into a pin mixer, initial granulation of particles into fine granules is followed by immediate re-agglomeration which provides a flexibility in the process for feed materials with a wide range of particle size distribution. Size enlargement of the agglomerated particle can be closely controlled in a pin mixer by controlling the moisture content of the feed material, residence time, rate of introducing feed material into the pin mixer, and pin speed. Such process and product variabilities are not available using the prior art "discrete particle" process.

This agglomeration process for producing gas-phase chemically activated carbons of high density and high activation requires no special binders other than water and, therefore, completely relies on the inherent binding quality of the plastic char developed in an earlier heat treating stage. Optionally, formed granules may be heat treated further to assure strong bonding and, consequently, particle strength.

Activated carbon prepared according to this process exhibited a butane working capacity of 18.1 g/100 cm$^3$, an apparent density of 0.29 g/cm³, a particle density of 0.48 g/cm³, a mesopore volume of 59%, and a macropore volume of 14%.

The foregoing method is capable of producing the invention high activity, high density activated carbon from relatively low density lignocellulose materials, such as wood chips, wood flour, and sawdust.

Referring again to Table I, the increase in the BWC of pin mixer-prepared carbon as compared to a lab baseline carbon prepared without using a pin mixer was mainly due to the significant (about 50%) increase in the apparent density of carbon through reductions of the macropores of carbon and the void space between the particles by the agglomeration process.

The following example typifies the method of this invention.

EXAMPLE

An activated carbon product of the invention process was prepared by combining 2,000 g of aqueous 85% concentration phosphoric acid solution with 1,900 g of wet sawdust (for an acid:sawdust ratio of 1.6:1) and blending same in a mechanical mixer for 10 minutes at room temperature. The mixture was heated in an oven at 177° C. for 45 minutes and then dried in a steam oven at 177° C. for 45 minutes, with stirring at 15 minute intervals. The plastic char mixture, in an amount of 2.7 l, was fed into a pin-mixer (specifically, a batch Turbulator TM, manufactured by Ferro-Tech) rotating at 1,000 rpm. This now granular char was reduced to fines, re-agglomerated (after adding 100 ml of water (100 ml)), and densified into near spherical granules of about 10×25 mesh (0.7-2.0 mm) in size in about 5 minutes. The shaped char was thermoset in an oven at 82° C. for 60 hours. Subsequently, the char was activated by heating to 482° C. in about 60 minutes in a direct-fired rotary kiln. The activated product was washed with water, dried in an oven, and evaluated.

Product properties of a the pin mixer-produced carbon are compared with a commercial vapor adsorption carbon, a lab baseline product produced without shaping and densification, and a product of the "discrete particle" process of Ser. No. 07/853,133 in Table II.

TABLE II

| Product/Process | Butane Activity gm/100 gm | Butane Work Cap gm/100 cc | Apparent Density gm/cc | Particle Density gm/cc | Macropore Fraction of Particle Volume % | Mesopore Fraction of Particle Volume % | Surface Area m²/g |
|---|---|---|---|---|---|---|---|
| WVA-1100 (Plant Product) | 47.3 | 11.3 | 0.28 | 0.48 | 23 | 47 | 1840 |
| Lab Baseline (no Shaping) | 70.2 | 13.1 | 0.20 | 0.44 | 17 | 53 | 2523 |
| Discrete Particle Process | 68.0 | 17.7 | 0.30 | 0.46 | 12 | 58 | 2180 |
| Agglomeration (pin mixer) Process | 69.7 | 18.1 | 0.29 | 0.48 | 12 | 60 | 2420 |

Comparison of the data for the invention process with the lab baseline data clearly show the benefits of the pin mixer treatment. With comparable butane activity and surface area, the shift in pore size distribution (from macropores to mesopores) resulting from the increased particle density produced a significant increase in butane working capacity.

While the invention preparation of high activity, high density carbon has been described and illustrated herein by references to various specific materials, procedures, and examples, it is understood that the invention is not restricted to the particular materials, combinations of materials, and procedures selected for that purpose. With the disclosure herein of the concepts employed to produce the novel carbon, numerous variations of such details can be employed, as will be appreciated by those skilled in the art.

What is claimed is:

1. A method for producing high activity, high density activated carbon derived from lignocellulosic material comprising the steps of:
   (a) blending together fragments of the lignocellulosic material with a chemical activation agent selected from the group consisting of phosphoric acid and zinc chloride to form an acid char;
   (b) heat treating the blended material both to effect plasticization and drying of the acid-treated lignocellulosic material to a moisture content of up to about 25% by weight;
   (c) shaping and densifying the heat-treated, acid-treated lignocellulosic material by sequentially pulverizing the material into fine particles followed by re-agglomeration of the fine particles in the presence of moisture to form generally spherical shaped, high density carbon in a pin mixer; and
   (d) activating the shaped, high density carbon by heating gradually up to a final activation temperature of about 550° C., wherein the final shaped, high density carbon is characterized by a butane working capacity of from about 15 to about 25 g/100 cm³ and a pore volume greater than 50% in pores from about 1.8 to about 50 nm in diameter and less than 20% in pores greater than 50 nm in diameter, based on total pore volume.

2. The method of claim 1 wherein the lignocellulosic material is selected form the group consisting of wood chips and sawdust.

3. The method of claim 1 wherein the ratio of chemical activating agent to lignocellulosic material is from 3:1 to 1:1, respectively.

4. The method of claim 3 wherein the ratio is 1.6:1.

5. The method of claim 1 wherein the blending of step (a) is conducted at from about 35° to about 95° C. for a period up to about one hour.

6. The method of claim 1 wherein the product of step (c) is subjected to a heat treatment of from about 35° to about 95° C. prior to activation.

7. An improved method for preparing an activated carbon comprising the steps of blending a lignocellulosic material with a chemical activating agent selected from the group consisting of phosphoric acid and zinc chloride to produce an acid char, heating to plasticize the said char, shaping the heated acid char, and heat activating the shaped, heated acid char up to a final activation temperature of 550° C. wherein the improvement comprises producing an activated carbon characterized by a routine working capacity of from above 15 to about 25 g/100 cm³ by conducting the shaping step by pulverizing and reagglomerating the acid char in the presence of moisture in a pin mixer.

8. The improved method of claim 7 wherein the lignocellulosic material is selected from the group consisting of wood chips and sawdust.

9. The improved method of claim 7 wherein the ratio of chemical activating agent and lignocellulosic material is from about 3:1 to about 1:1, respectively.

10. The improved method of claim 9 wherein the ratio is about 1.6:1.

* * * * *

UNITED STATES PATENT AND TRADEMARK OFFICE
CERTIFICATE OF CORRECTION

PATENT NO. : 5,250,491
DATED : October 5, 1993
INVENTOR(S) : Zhiquan Q. Yan

It is certified that error appears in the above-indentified patent and that said Letters Patent is hereby corrected as shown below:

On the title page, under References Cited, delete "Krcil" and substitute therefor --Krczil--.

In column 1, line 39, delete "< 50 nm" and substitute therefor --> 50 nm--.

In column 6, line 41, delete "(".

In Claim 7, column 8, line 53, delete "said" and substitute therefor --acid--.

In Claim 7, column 8, line 57, delete "routine" and substitute therefor --butane--.

Signed and Sealed this

Twenty-fifth Day of October, 1994

Attest:

BRUCE LEHMAN

*Attesting Officer*     *Commissioner of Patents and Trademarks*